United States Patent
Dangel et al.

(10) Patent No.: US 7,382,954 B1
(45) Date of Patent: Jun. 3, 2008

(54) METHODS FOR PASSIVE MICROMETER-RANGE ALIGNMENT OF COMPONENTS USING REMOVABLE REFERENCE STRUCTURES

(75) Inventors: Roger F. Dangel, Zug (CH); Tobias P. Lamprecht, Berneck (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/925,416

(22) Filed: Oct. 26, 2007

(51) Int. Cl.
*G02B 6/26* (2006.01)
*G02B 6/36* (2006.01)

(52) U.S. Cl. .............. 385/52; 385/78; 385/88; 385/89

(58) Field of Classification Search .......... 385/52, 385/60, 62, 78, 80, 85, 88, 89
See application file for complete search history.

(56) References Cited

U.S. PATENT DOCUMENTS

| | | | |
|---|---|---|---|
| 6,741,778 B1 * | 5/2004 | Chan et al. ........... | 385/52 |
| 6,986,608 B2 | 1/2006 | Choudhury et al. | |
| 7,083,336 B2 | 8/2006 | Kim et al. | |
| 7,086,788 B2 | 8/2006 | Mazotti et al. | |
| 2002/0181881 A1 * | 12/2002 | Kunkel et al. ......... | 385/52 |

FOREIGN PATENT DOCUMENTS

JP 2002228881 A 8/2002

* cited by examiner

*Primary Examiner*—Frank Font
*Assistant Examiner*—Charlie Peng
(74) *Attorney, Agent, or Firm*—Cantor Colburn LLP; Peter Klett

(57) ABSTRACT

A method for passive alignment of adapters, enabling high-precision connection between components on a rigid or flexible substrate as part of a printed circuit board (PCB) is provided. Removable alignment structures are positioned in an alignment area on a PCB, where the alignment structures are in accordance with a patterned layer. An adapter, having adapter mating pins or holes, respectively, and adapter alignment pins, is placed on the PCB in the alignment area such that the adapter is aligned with the alignment structures. The adapter alignment pins are inserted into holes in the alignment structures. A ferrule is fixed on the PCB in the alignment area, and the ferrule holes or pins, respectively, are aligned to mate with the adapter mating pins or holes, respectively. The adapter is removed from the alignment structures, and finally the alignment structures are removed.

3 Claims, 4 Drawing Sheets

METHODS FOR PASSIVE MICROMETER-RANGE ALIGNMENT OF COMPONENTS USING REMOVABLE REFERENCE STRUCTURES

CROSS-REFERENCE TO RELATED APPLICATIONS

This application contains subject matter which is related to the subject matter of the following co-pending applications, each of which is assigned to the same assignee as this application, International Business Machines Corporation of Armonk, N.Y. Each of the below listed applications is hereby incorporated herein by reference in its entirety: "METHODS FOR PASSIVE MICROMETER-RANGE ALIGNMENT OF COMPONENTS USING REMOVABLE REFERENCE STRUCTURES" having the IBM docket No. CH920070055US1.

TRADEMARKS

IBM® is a registered trademark of International Business Machines Corporation, Armonk, N.Y., U.S.A. Other means used herein may be registered trademarks, trademarks or product names of International Business Machines Corporation or other companies.

BACKGROUND

An exemplary embodiment of this invention relates to optical printed circuit board technology, and particularly to methods for passive alignment of adapters, enabling high-precision connection between optical flexes and optical elements in which the methods are based on removable reference structures.

Currently, numerous worldwide industrial and academic R&D teams are working on the development of an optical printed circuit board (PCB) technology. One of the hurdles of this development is to find a reliable, high-precision, low-cost method to align components, such as optical connectors, vertical cavity surface emitting laser (VCSELs), photodiodes, and lenses on the PCB.

However, the described alignment issue for optical PCBs can also be understood in a much broader sense and can be transferred to other fields of application where a high-precision, fully passive, mechanical alignment of components on a low-precision carrier is required.

With regard to optical PCB development, the major challenge of the mentioned alignment task lies in the fact that for conventional PCBs, he manufacturing tolerances (e.g., board distortion tolerances, copper layer patterning tolerances, mutual layer alignment tolerances, milling tolerances) are typically 100 µm (micrometers), while for multi-mode optical links on optical PCBs, the alignment tolerances to achieve sufficient optical coupling efficiency between optical components are about 5 µm.

In order to address this discrepancy between PCB and optical requirements, most of the solution approaches worldwide are based on actively controlled, time-consuming, and therefore cost-intensive alignment procedures. FIG. 1 illustrates an example of a fully passive alignment method. In the passive alignment method, alignment structures 110 (e.g., a set of copper alignment markers) integrated in the PCB 120 and realized by conventional PCB processes take manufacturing tolerances into account. These cooper alignment structures 110 serve as reference markers to find back the position of the integrated waveguides (not shown) patterned with respect to the copper alignment structures 110. Furthermore, these copper alignment structures 110 exhibit mechanical features for the alignment and assembly of mechanical adapters 130 carrying the component to be aligned. Finally, the placement of the adapter 130 onto the PCB 120 can be performed by a low-precision handling tool 140 or by a conventional pick-and-place tool. Further details of a passive alignment method may be found, for example, in U.S. Pat. No. 7,212,698, herein incorporated by reference.

For many alignment tasks within the field of optical PCBs, the above-described method will be fully sufficient. However, there may be certain applications where the footprint of the copper markers (e.g., copper alignment structures 110) and the dimensions of the adapter 130 could be an issue in terms of the space requirments at a PCB edge or within a PCB. The board edge can become a bottleneck regrading the available space for the required electrical as well as optical connectors. A similar situation can occur within the board where board openings are realized for the assembly of components, such as optical transceiver modules.

In both cases, it would be beneficial to have methods to reduce the footprint of the marker set and the adapter and to have more freedom in the positioning and the design of these features. Further, it would be beneficial to use these features for the alignment of the component and to make them removable to retrieve the space required by the alignment features.

SUMMARY

In accordance with an exemplary embodiment, a method for passive alignment of adapters, enabling high-precision connection between optical flexes and optical elements on an optical PCB, is provided. This method uses removable reference structures. The reference or alignment structures are based on a patterned copper layer and are realized on a flexible substrate. An array of waveguides is manufactured on the flexible substrate. These waveguides are aligned to the alignment structures with micrometer accuracy. A rigid substrate is placed underneath the flexible substrate within the alignment area to support the flexible substrate. In this supported area, an MT-adapter is placed on the flexible substrate such that the MT-adapter is aligned with the alignment structures, where the MT-adapter includes MT-adapter mating pins and MT-adapter alignment pins. The MT-adapter alignment pins are inserted into the alignment structures. An MT-ferrule is fixed on top of the array of waveguides, where the MT-ferrule is aligned such that the MT-adapter mating pins mate with the MT-ferrule. The MT-adapter is removed from the alignment structures. Sawing is performed to remove the alignment structures and to release the assembled optical flex.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of exemplary embodiments of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE EXEMPLARY EMBODIMENT

Figure 1:
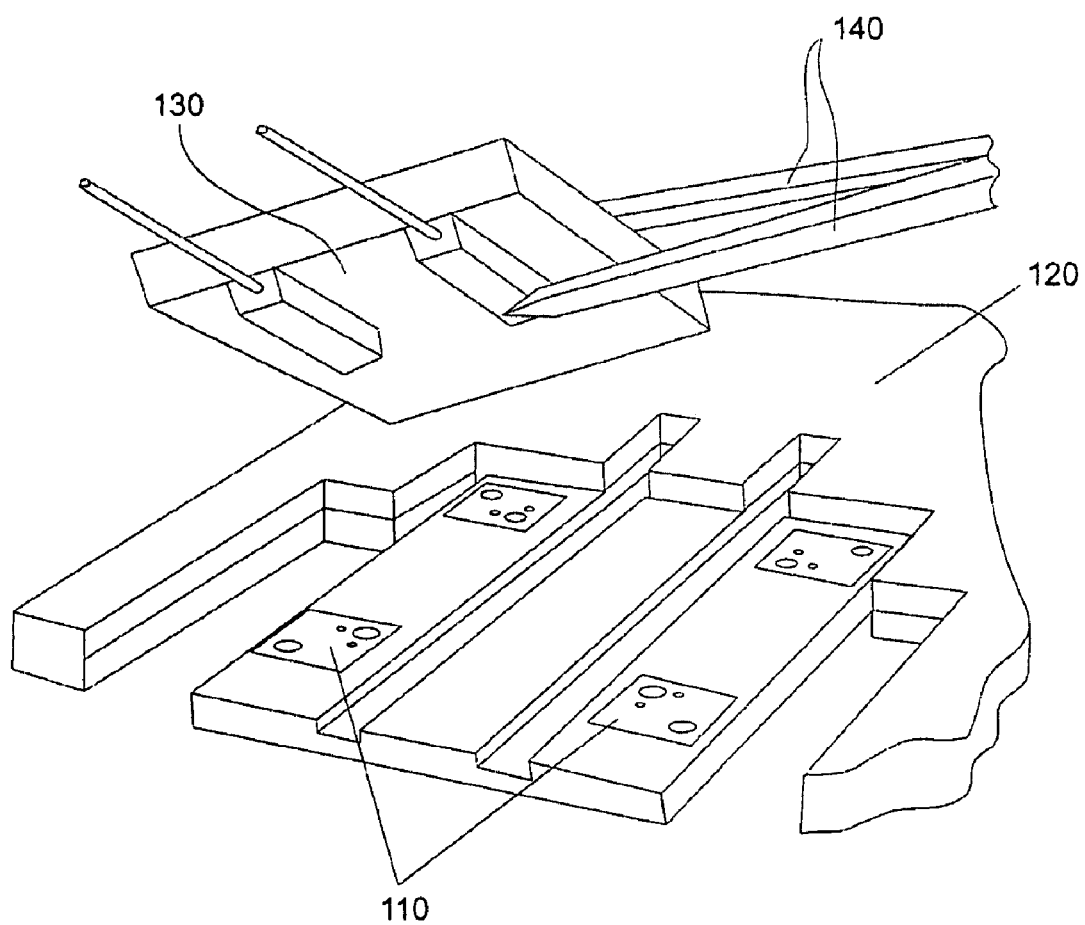
FIG. 1 illustrates one example of building blocks used in a fully passive alignment method.
Figure 2:
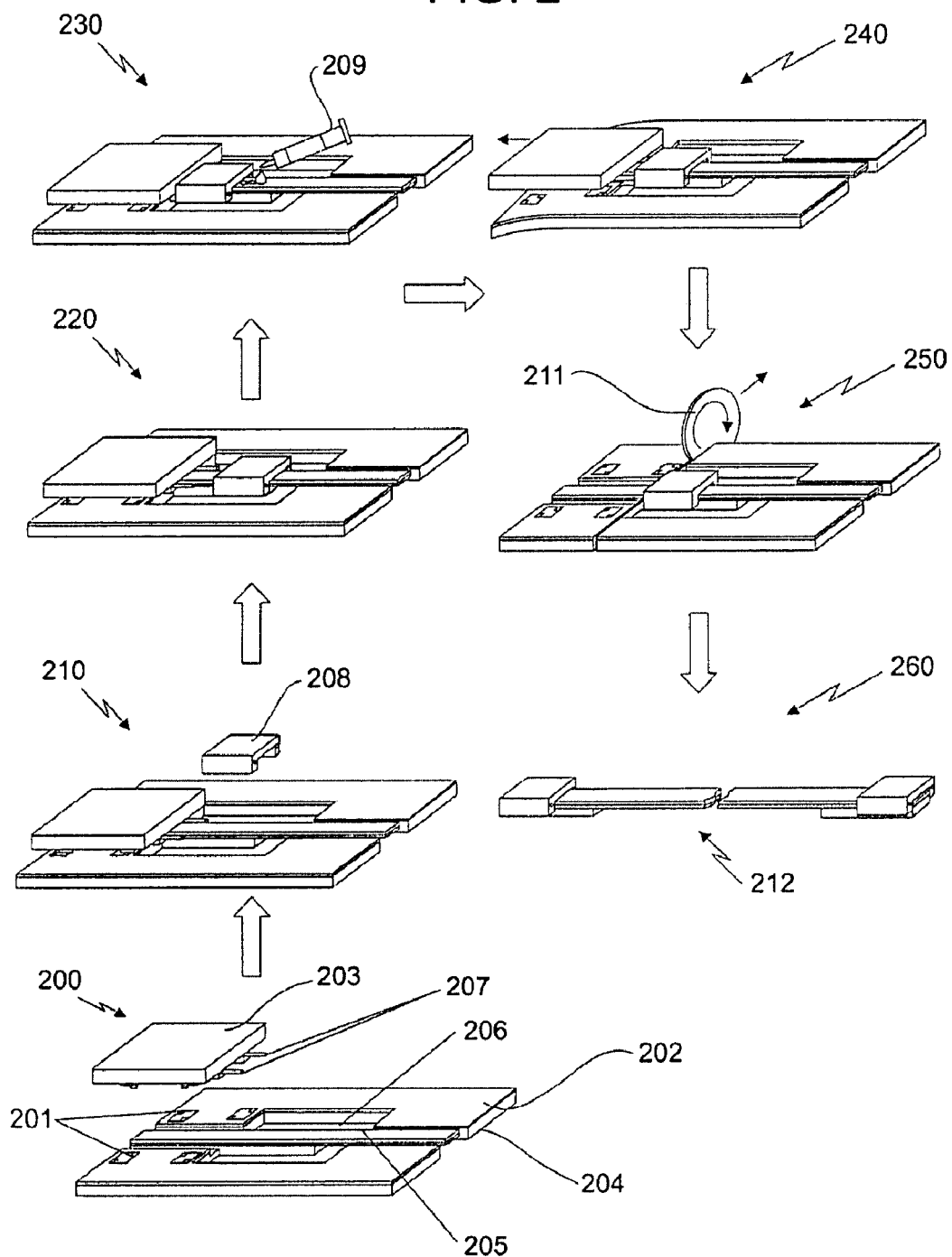
FIG. 2 illustrates a method of assembling an optical flex with a connector in accordance with one aspect of an exemplary embodiment.

In accordance with one aspect of the exemplary embodiment, FIG. 2 illustrates a method of assembling an optical flex with a connector. Block 200 illustrates alignment markers 201 (e.g., alignment features based on a patterned copper layer) on a flexible substrate 202 (e.g., polyimide foil). Within the alignment area, a rigid substrate 204 is placed underneath the flexible substrate 202 and serves as a stiffener for a flexible substrate 202. Multiple waveguides 205 run on the flexible substrate 202 between the alignment markers 201 and are aligned with the alignment markers with micrometer accuracy.

Block 210 illustrates the insertion of a large form-factor MT-adapter 203 into the alignment markers 201 and the preparation for a small form-factor MT-ferrule 208. The MT-adapter 203 is positioned such that the alignment pins of the MT-adapter 203 mate with the mechanical alignment features (e.g., which may be holes for receiving the alignment pins) of the alignment markers 201. Additionally, the MT-adapter 203 includes MT-adapter mating pins 207 which mate with the alignment holes of the MT-ferrule 208.

In block 220, the MT-ferrule 208 is positioned on top of the waveguides 205 which are supported by the flexible substrate 202. The MT-ferrule 208 is mounted on or to the MT-adapter pins 207, and the MT-ferrule 208 is aligned with the MT-adapter 203.

In block 230, the MT-ferrule 208 is securely fixed in place using a fixing means 209 (e.g., an adhesive). Once the MT-ferrule 208 is in place, the MT-adapter 203 is removed in block 240.

Milling or sawing is performed by saw 211 to remove the alignment markers 201 and to release the assembled optical flex 212 in block 250. Block 260 illustrates an assembled optical flex 212. The operations as described herein are performed for both ends of the optical flex 212.

In accordance with the exemplary embodiment, the MT-adapter 203 passively aligned with the alignment markers 201 serves only for the alignment and the assembly of the MT-ferrule 208. Afterward, the MT-adapter 203 is removed and the alignment markers 201 are cut away.

In accordance with the exemplary embodiment, the assembled optical flex 212 comprises two space saving connectors based on the standard MT-ferrule 208. The small form-factor connectors of the optical flex 212 make more space available (e.g., at a PCB edge or within a PCB opening) for additional optical and/or electrical connectors, as compared to having the large form-factor MT-adapters 203 at the PCB edge or within a PCB opening. With the reduced space requirements using optical flex 212, there can be an increased connector density on the PCB. Also, if necessary, the MT-adapter 203 can be reused in other assemblies.

Figure 3:
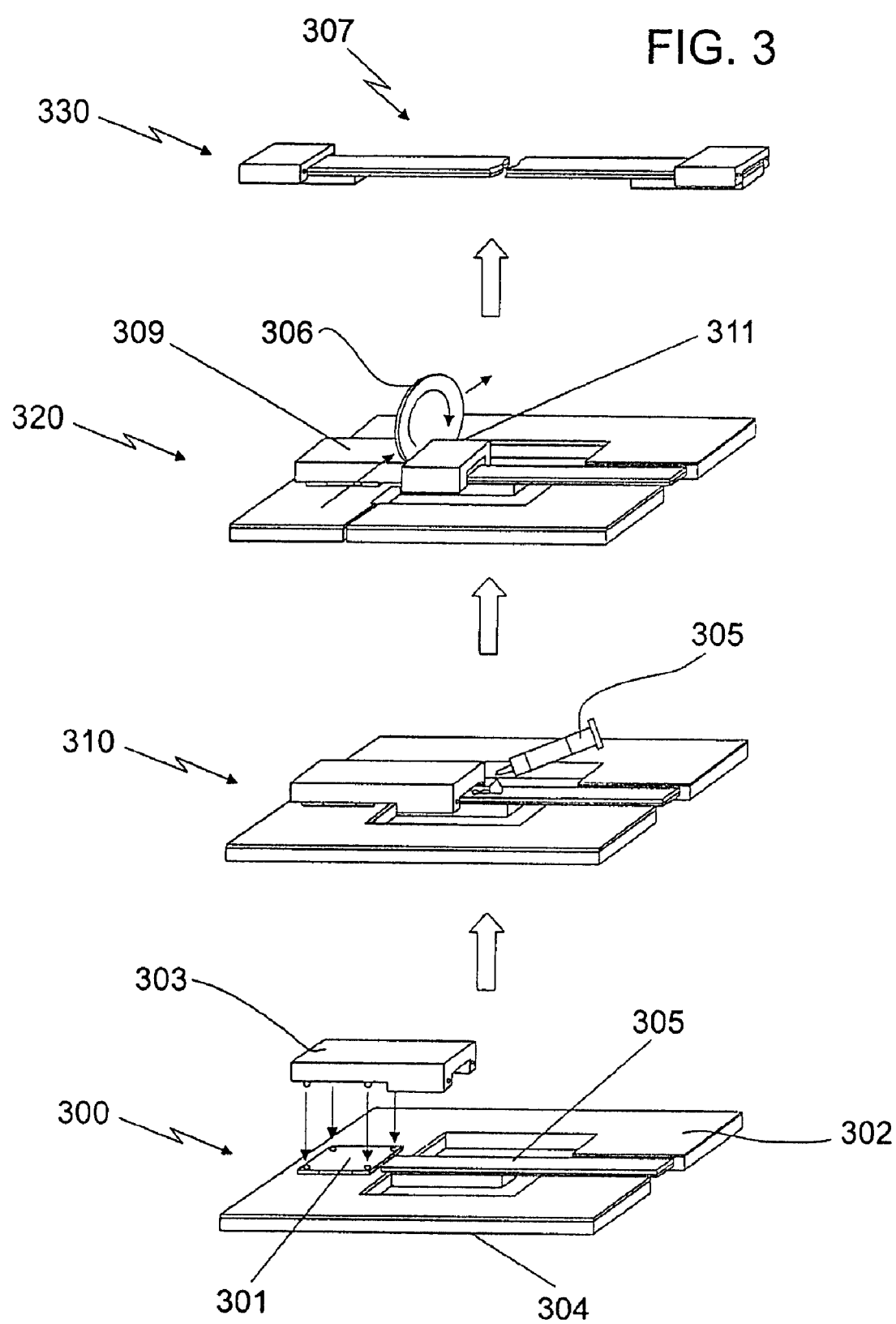
FIG. 3 illustrates a method of assembling an optical flex with a connector assembly in accordance with another aspect of the exemplary embodiment.

In accordance with another aspect of the exemplary embodiment, FIG. 3 illustrates a method of assembling an optical flex with a connector.

Block 300 illustrates an alignment structure 301 (e.g., alignment features based on a patterned copper layer) on a flexible substrate 302 (e.g., polyimide foil).

Within this alignment area, a rigid substrate 304 is underneath the flexible substrate 302 and serves as a stiffener for the flexible substrate 302. Multiple waveguides 305 run on the flexible substrate 302 to the alignment structure 301 and are aligned to the alignment structure 301 with micrometer accuracy. Block 300 also illustrates the insertion of a two-part connector 303 (e.g., which may be a small ferrule 311 integrated with a large adapter 309) into the alignment structure 301.

In block 310, the ferrule 311 is affixed to the flexible substrate 302 by a fixing means 305. Block 320 illustrates removing the adapter 309 of the two-part connector 303 by milling or sawing with saw 306. After the adapter 309 is removed, the small ferrule 311 remains on the flexible substrate 302. As well, the milling or sawing is performed to release the optical flex 307 by removing the alignment structure 301.

Block 330 illustrates an assembled optical flex 307. The operations discussed herein are performed for both ends of the optical flex 307.

In accordance with the exemplary embodiment, the two-part connector 303 includes the ferrule 311 (e.g., a small form-factor MT-ferrule) and the adapter 309 (e.g., a large form-factor MT-adapter) in which the adapter 309 serves for the alignment and the assembly of the ferrule 311. Afterward, the adapter 309 and the alignment structure 301 (e.g., an alignment marker) are cut away. As in the first method described above, the second method provides various space saving benefits, as discussed herein.

Figure 4:
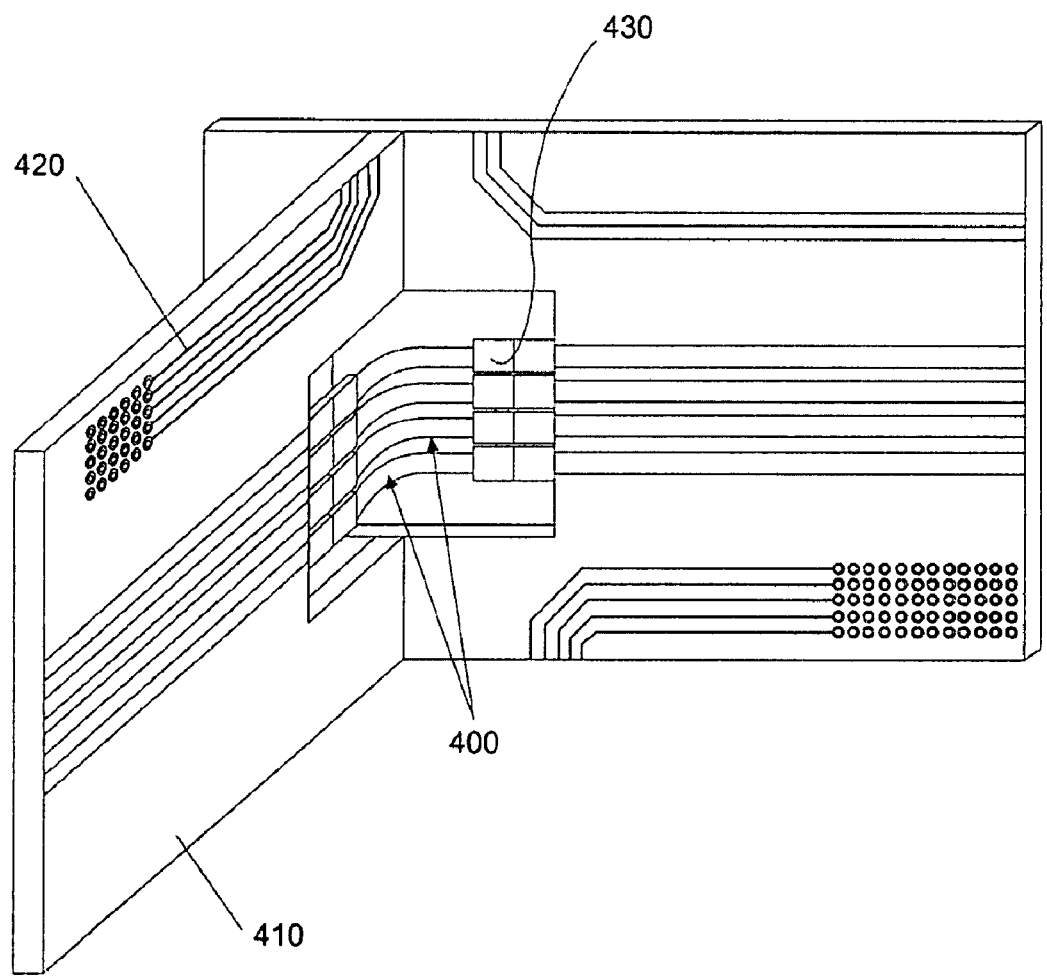
FIG. 4 illustrates optical PCBs, which are connected by optical flexes formed by methods in accordance with the exemplary embodiment.

FIG. 4 illustrates a non-limiting example of optical flexes 400 with optical connectors on both ends formed with the high-precision of the methods in accordance with the exemplary embodiment. As depicted in FIG. 4, optical flexes 400 can be used to optically connect optical PCBs 410 with each other. For certain high-data-rate applications the available space at an edge or in an opening of an optical PCB or at the interface between two optical PCBs can be limited, and accordingly, the optical connectors 430 are reduced in size.

In accordance with the exemplary embodiment discussed herein, the two high-precision alignment and assembly approaches based on the first and second methods may be used to form the optical flexes 400 on the optical PCB 410 in FIG. 4. In accordance with the exemplary embodiment, the standard MT-interface may be used to build the connection between the large form-factor adapter (e.g., MT-adapter 203) and the small form-factor component (e.g., MT-ferrule 208). It is understood, however, that other interfaces may be utilized in implementing the high-precision alignment and assembly method.

In accordance with the exemplary embodiment, the methods (first and second) discussed herein may be used for component alignment and component assembly at a PCB edge or within a PCB opening, which may be applied to any components. In the non-limiting examples discussed herein, the methods may be used for high-precision alignment of optical flexes 212, 307 with passively aligned small-footprint connectors and with passively aligned opto-electronic modules (such as transmitters, receivers, transceivers, etc.). Additionally, the methods allow for the use of components (e.g., connectors, optics, opto-electronic subassemblies, etc.) with integrated and disposable alignment parts in order to retrieve the space required by the alignment part.

For explanatory purposes, the versatile alignment and assembly methods have been described with respect to optical applications. However, the methods described herein are not limited to the alignment and assembly of optical components. Indeed, the high-precision alignment and assembly methods having removable alignment structures may be used in numerous applications and with varied components. Furthermore, it is understood that the methods described herein are neither limited to the standard MT-interface nor copper alignment structures, and other interfaces and alignment structures may be use to implement the methods described herein.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the exemplary embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for passive alignment of adapters, enabling high-precision connection between components on a rigid or flexible substrate as part of a printed circuit board (PCB), comprising:

positioning removable alignment structures having alignment holes in an alignment area on a substrate, wherein the alignment structures are in accordance with a patterned layer;

placing an adapter on the substrate in the alignment area such that the adapter is aligned with the alignment holes of the alignment structures, wherein the adapter comprises adapter mating pins or holes and adapter alignment pins;

inserting the adapter alignment pins into the alignment holes of the alignment structures;

fixing a ferrule having holes or pins on the substrate in the alignment area, wherein the ferrule is aligned such that the adapter mating pins or holes mate with the ferrule holes or pins, respectively;

removing the adapter from the alignment structures; and removing the alignment structures from the substrate.

2. The method of claim 1, wherein the patterned layer is a copper patterned layer, wherein the adapter is an MT-adapter, and wherein the ferrule is an MT-ferrule.

3. The method of claim 1, further comprising positioning an array of waveguides manufactured on the substrate, wherein the waveguides are aligned to the alignment structures with micrometer accuracy, and wherein a final PCB is an optical PCB.

* * * * *